Oct. 14, 1952      J. J. JAKOSKY      2,613,536
GRAVITY METER
Filed July 30, 1946      3 Sheets-Sheet 1
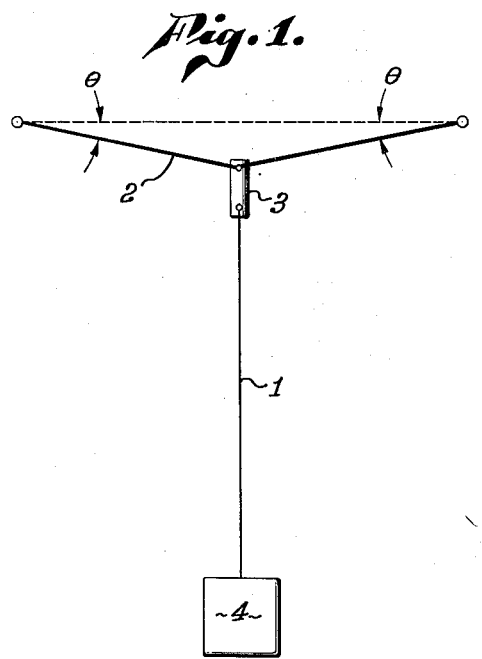
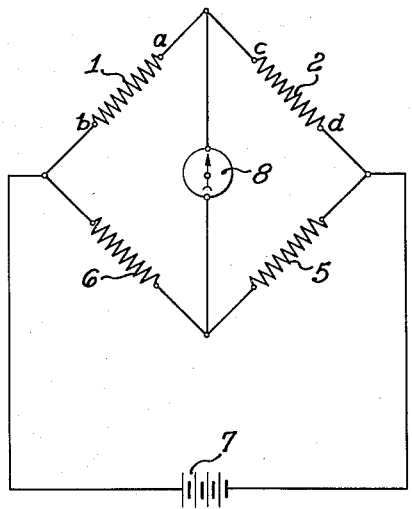
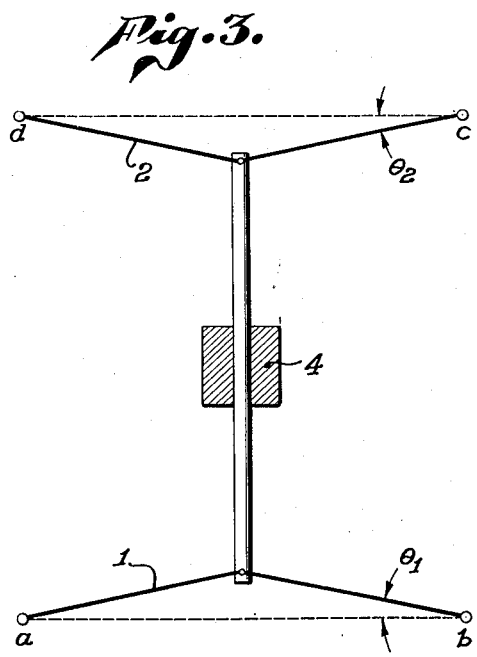
INVENTOR.
John J. Jakosky
BY Ross J. Garofalo
ATTORNEY Oct. 14, 1952  J. J. JAKOSKY  2,613,536
GRAVITY METER
Filed July 30, 1946  3 Sheets-Sheet 2
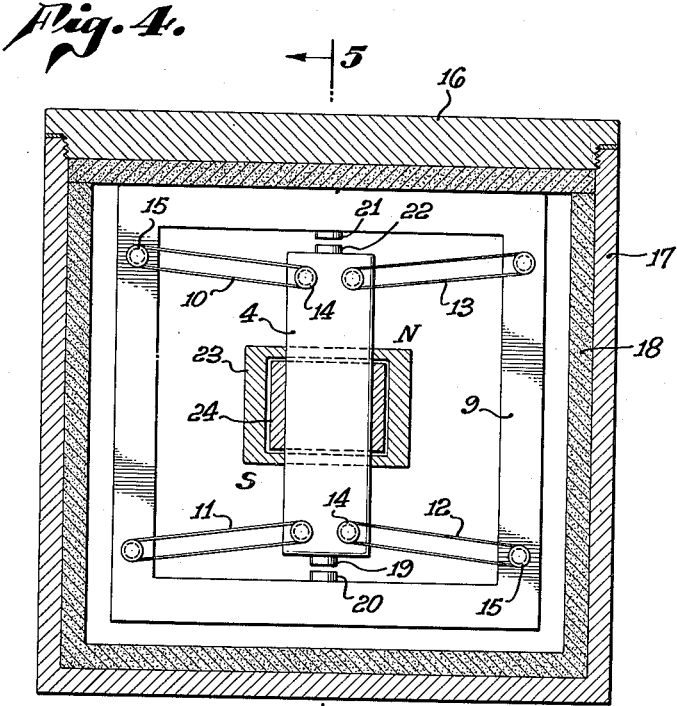
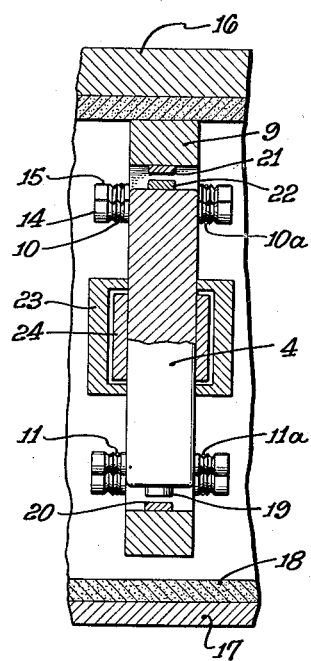
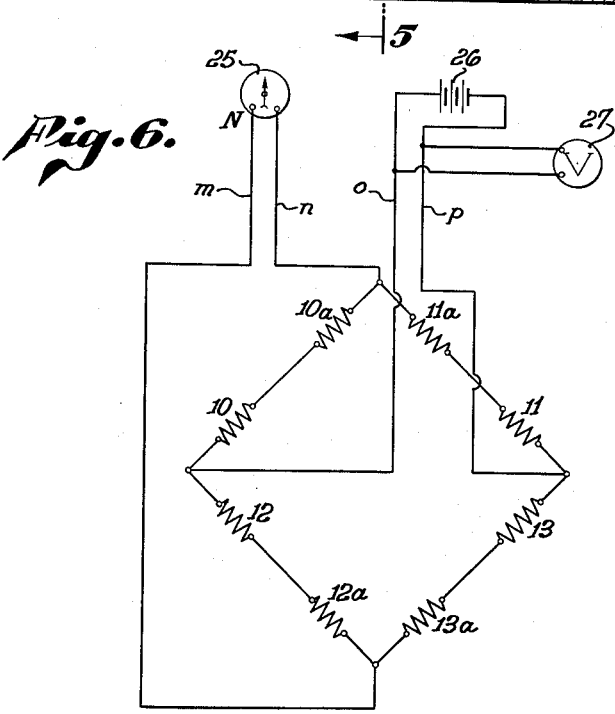
INVENTOR.
John J. Jakosky
BY Ross J. Garofalo
ATTORNEY Oct. 14, 1952  J. J. JAKOSKY  2,613,536
GRAVITY METER
Filed July 30, 1946  3 Sheets—Sheet 3
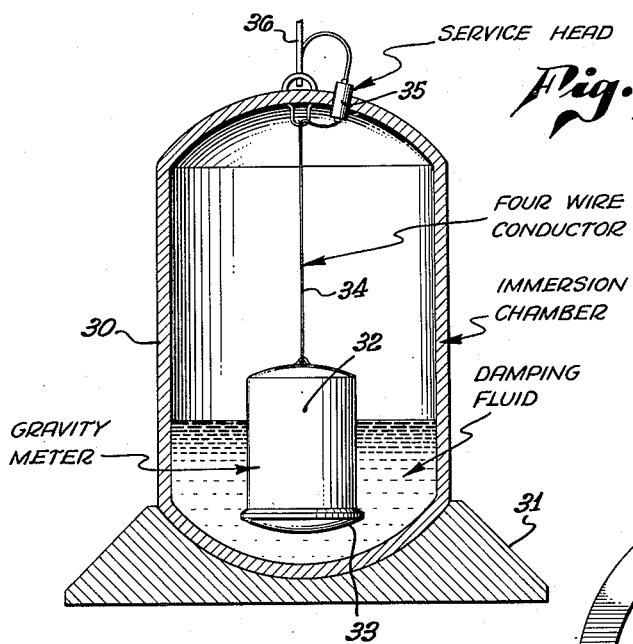
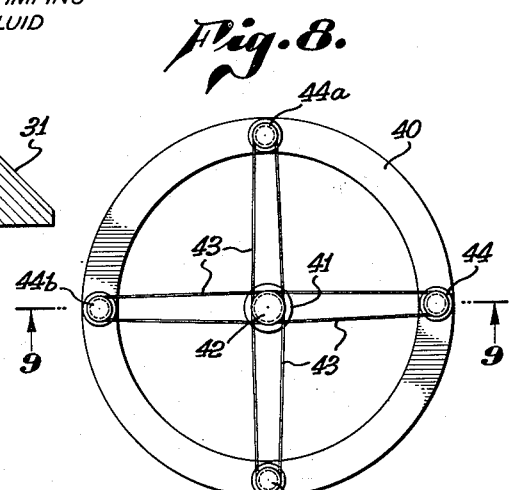
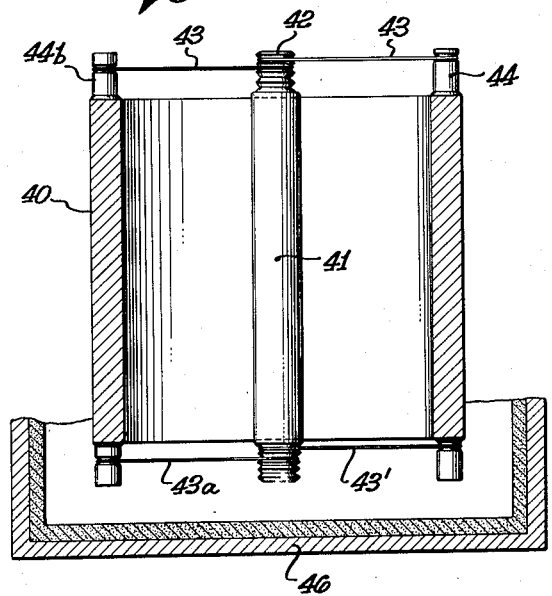
INVENTOR.
John J. Jakosky
BY Ross J. Garofalo
ATTORNEY Patented Oct. 14, 1952

2,613,536

UNITED STATES PATENT OFFICE 2,613,536

GRAVITY METER

John J. Jakosky, Los Angeles, Calif.

Application July 30, 1946, Serial No. 687,060

9 Claims. (Cl. 73—382)

This invention relates to apparatus for making geophysical measurements to determine the character of the earth's subsurface structure. More particularly, it relates to a method and apparatus for the measurement of the variations of the force of gravity from point to point over the earth's surface.

It has been recognized for some time that the force of gravity or the gravitational acceleration varies somewhat from place to place, even over a relatively small area of the earth's surface dependent upon the differences in the structure of the earth's crust. This variation is related to the average density of the sub-surface materials at any given point. For example, a formation of relatively dense structure, either protruding from the earth or entirely hidden beneath the surface, will bring about an increase in the value of $g$ (gravitational attraction) while intrusion of a relatively light body at a particular point will tend to decrease the value of $g$ at that point. This fact has been relied upon as an aid to the location of hidden deposits of minerals and petroleum, and geophysical prospecting based thereon is particularly well suited to regions in which variations of the value of $g$ may be taken to indicate with fair certainty a particular type of sub-surface condition. An outstanding example of this type of geophysical prospecting is found in the Gulf Coast region of the United States, in which region it has been discovered that typical minima variations in the gravitational attraction from the normal usually indicate the presence of salt domes. To anyone familiar with geophysical exploration this is usually indicative of a structure suitable for the accumulation of oil.

Various devices have been suggested and employed in the past for ascertaining these variations in gravity. These devices quite often involve the usage of an optical lever to indicate the movement of an elastically suspended mass resulting from variations in gravitational attraction. Numerous difficulties are involved in the use of a mass suspended by a spring for making accurate measurements of the variations of gravity. Similar difficulties occur in the usage of a mass suspended by a torsion wire. In each case there is the problem of devising a sufficiently sensitive means for measuring the displacement of the mass. As an example of the sensitivity required in an instrument for this purpose, assume that a mass is suspended by a helical spring which we may suppose is extended a distance of six inches at one locality. If then the device is moved to a place where the acceleration of gravity differs from the former by one part in ten million the extension of the spring will change by only six ten-millionths of an inch. It is apparent that extremely sensitive means are necessary to determine this minute change.

Due to the small differences with which it is necessary to deal in this type of measurement, temperature changes are of considerable importance due to the effect thereof on the properties of an elastic system, such as employed in the gravimeter or torsion balance. Similarly, imperfect elasticity characteristics of the materials used in the construction of the instrument will cause appreciable deflections of normal readings as a result of creep, fatigue, elastic after-effects, and the like. Further, all of the foregoing difficulties together with the extreme sensitivity required make calibration of instruments of the aforementioned types extremely difficult.

It is an object of the present invention to provide an apparatus for the determination of variations in the gravitational attractions of the earth at various locations on the earth's surface.

A further object of my invention is to provide an instrument that it not too critical as regards leveling, and which may be made self-leveling.

It is another object of my invention to provide such an apparatus which is capable of accurate operation by remote control. This feature represents a decided advancement in the art inasmuch as the conventional gravity meters necessitate the taking of readings at the point of location of the instrument itself. Correlative to the foregoing object, it is a further object to provide a method and apparatus whereby such measurements of gravity differentials may be made over portions of the earth's surface covered by water.

It is also an object of the present invention to provide an apparatus whereby the normally critical factors of temperature, fatigue, creep, elastic after-effect, and the like, are substantially compensated for within the instrument and thus do not materially affect the accuracy or the sensitivity thereof.

It is further within the contemplation of the present invention to accomplish the foregoing objects by the utilization of a principle unique to the art of gravity differential determinations. It follows, therefore, that although particular examples of instruments employing this principle may be described and illustrated herein, I do not intend to be limited thereby inasmuch as it will be apparent that the scope of the invention exceeds any specific apparatus which may be shown.

Other objects and advantages of my invention will become apparent to those skilled in the art as the description thereof proceeds.

The fundamental principle involved in the determination of gravity changes over the earth's surface according to my invention comprises the measurement of the changes in electrical properties of a conductor induced by variations in the stress in the conductor. These variations in stress are in turn induced by differential strain applied to the conductor as a result of the force of gravity acting on a given mass suspended directly or indirectly from the conductor. Thus, as the gravitational constant varies, the weight of the mass will change accordingly which will in turn alter the strain applied to the conductor from which the mass is suspended. This alteration in strain will be reflected in an equivalent change in the stress, providing, of course, that the elastic limit of the conductor is not exceeded, which change in stress will affect the electrical properties of the conductor accordingly. Thus, providing the elastic limit of any conductor is not exceeded, such electrical properties as resistance, inductance and capacitance will vary with variations in stress. Of these properties resistance is most effectively measured according to the present invention inasmuch as the variations therein are proportional to the change in length of the wire while inductance is proportional to the log of the length and capacitance is inversely proportional to the log of the length. It is apparent from these relationships that a given change in length will result in a larger differential in resistance than in inductance or capacitance. Whereas, in the preferred embodiment of my invention resistance measurements are utilized to accomplish the object thereof, the invention is not to be construed as limited to such embodiment inasmuch as other electrical properties may be employed to indicate the variations in stress in the conductor.

In utilizing this principle in its simplest aspects, a weight is suspended in such a fashion as to exert a stretching force on a suspension wire across which a constant potential is impressed and the variations of strain on the wire induced by variations in the gravitational attraction on the weight suspended therefrom are detected by measurement of the variations in resistance of the wire.

Inasmuch as it has been shown that this resistance will vary linearly with the strain applied or similarly, with the increase in length of the suspension wire, it will be seen that if the vertical component only is taken into account the resistance variations will be extremely small for those differences in gravitational attraction which are being measured. However, and of considerable importance to the present invention, I have greatly increased the resistance differentials in relation to a given change in gravitational attraction by suspending the aforementioned weight from a substantially horizontal suspension wire whereby the vertical component of force exerted by the weight suspended therefrom is increased in an inverse proportion to the sine of the angular displacement of the suspension wire from the horizontal. Thus, if the suspension wire is maintained at approximately one-half degree from the horizontal, the strain exerted on the wire will be in the order of magnitude of one hundred times that exerted on a vertical suspension wire, and will result in a similar multiplication of the change in resistance and other electrical properties.

While the foregoing description sets forth the basic principle of the invention, the preferred embodiment thereof consists in a somewhat more elaborate modification of this principle. Thus, if the resistance across one wire is used as a means for detecting gravitational changes, numerous inherent problems arise which tend to reduce the sensitivity and accuracy of an instrument employing such means. A system of this nature would possess the same susceptibility to such detrimental factors as temperature changes, fatigue, creep, elastic after-effect, and the like, as are noticed in the conventional gravity meters now employed. Although this simple system does not represent the preferred embodiment of this invention, it is to be understood that it is within the contemplation thereof to employ this principle as hereinbefore set forth in its simplest aspects for the determination of changes in gravitational attraction and particularly in those cases wherein a high degree of accuracy is not essential.

By suitable modification of the above described arrangement, however, these difficulties may be substantially eliminated. It has been shown above that by suspending the aforementioned weight from a substantially horizontally positioned wire that the vertical component of force exerted by the weight is changed into horizontal mechanical components of considerably greater magnitude. Similarly by the utilization of the principle of a Wheatstone bridge, as hereinafter more clearly set forth with reference to the description of the accompanying drawing, the undesirable effects of temperature variations, fatigue, and the like may be substantially eliminated within the instrument itself, thus having little, if any, effect on the readings obtained therefrom.

The invention may be more clearly understood by reference to the accompanying drawings in which:

Figure 1 is a diagram of one method of suspension of the weight so as to increase the strain applied to the conductor, the resistance changes of which are to be measured.

Figure 2 is a wiring diagram of an apparatus employing the arrangement of Figure 1, wherein the conductor forms two legs of a Wheatstone bridge.

Figure 3 is a cross sectional diagrammatic view of a more elaborate apparatus in which temperature and similar factors may be compensated for.

Figure 4 is a cross sectional view of one modification of an apparatus utilizing the principles of the present invention, Figure 5 is a section taken along line 5—5 of Figure 4. The case in this particular embodiment being cylindrical the extremities thereof are omitted in Figure 5, Figure 6 is a wiring diagram for the apparatus of Figure 4 wherein the suspending conductors are employed as the legs of a Wheatstone bridge, Figure 7 is a cross sectional view of a means for accomplishing the self-leveling of the instrument. Such an apparatus is particularly useful for under-water prospecting.

Figure 8 is a top view of another embodiment of the present invention wherein the mass is suspended radially in order to overcome the sensitivity to motion and angular positioning, and Figure 9 is a cross section of the instrument of Figure 8 taken along the line 9—9 of Figure 8.

In Figure 1, numerals 1 and 2 comprise two identical electrical conductors of a material having low mechanical and electrical drift or creep, which will be operated at stresses well below the elastic limit. A weight of mass 4 is suspended directly from wire 1, and produces a strain which may be expressed as follows:

$$S_1 = W/a$$

where $S_1$ equals the strain per unit area of the wire, W is the weight of the mass 4 and $a$ is the cross-sectional area of the wire 1.

Disregarding for the moment the conductor 2, it is possible to measure the changes in resistance of conductor 1 induced by the strain $S_1$ and thus directly determine changes in gravitation. However, as previously indicated, the changes would be of an order of magnitude difficult to measure. However, by transforming this vertical component of force or pull on wire 1, to its horizontal component by means of a second wire 2 arranged in a substantially horizontal position, the strain of wire 2 can be made to vary any desired number of times greater than that of wire 1, merely by controlling the angle $\theta$ between the wire and the horizontal. For instance, if the wire 2 is positioned so as to make an angle $\theta$ of 0.5 degree from the horizontal the sine of $\theta$ is approximately .01, and the strain on each half of wire 2 will be 50 times that of the weight 4. Therefore, under the conditions illustrated in Figure 1, the strain per unit area of wire 2 may be expressed as:

$$S_2 = \frac{W}{2a \sin \theta}$$

where $S_2$ represents the strain per unit area of wire 2, W, the weight of mass 4, $a$, the cross sectional area of wire 2, and $\theta$, the angle of depression of wire 2 from the horizontal.

In this fashion the change of resistance of wire 2 may be measured directly for the determination of differentials in gravitational attraction and in such a system the sensitivity of the instrument would be greatly increased. However, certain problems relating to the effect of temperature changes, fatigue, and the like will still be present. To eliminate these problems, however, it is apparent that, since both wires 1 and 2 may be of identical shape, size and material and may be placed in the same thermally insulated container, it is relatively simple to compare the difference in strain of these two wires without the necessity of employing elaborate means for temperature or other controls. In this manner the reference wire 1 is subjected to the same thermal and barometric changes and the same properties of creep and fatigue as wire 2.

The changes in the stress in wires 1 and 2 may be determined by various well known methods such as by measuring their changes in electrical resistance as the effective value of the weight is varied. It is well known that the mass of the weight 4 remains constant, but that the weight varies with the gravitational attraction $g$ of the earth. This relationship may be expressed by the simple equation: $W = mg$, wherein any change in the value of $g$ causes a proportional change in the value of W. As previously indicated, the changes in $g$ are manifested as changes in the strain ($S_1$) on wire 1 and the strain ($S_2$) on wire 2 in approximately linear relationship when operated well below the elastic limit of the material. Changes in $S_1$ and $S_2$ cause corresponding substantially linear changes in the electrical resistance of wires 1 and 2. The changes in electrical resistance of the two wires may be accurately compared by making them corresponding legs of a bridge circuit, as shown in Figure 2. For this purpose, it is necessary that wire 1 be electrically insulated from wire 2 which may be accomplished by means of the insulating length 3, shown in Figure 1.

Referring to Figure 2, wire 1 is placed in one leg of a Wheatstone bridge and wire 2 forms another leg. The bridge circuit is completed by resistors 5 and 6 so selected or adjusted that electrical balance is obtained for the particular weight and wire suspension system being employed. By maintaining a constant potential across the bridge by means of source 7, the deflections of the galvanometer 8 may be calibrated directly to be read as changes in gravitational acceleration. By making resistors 5 and 6 of similar materials as 1 and 2 and placing them in the same pressure sealed, thermally shielded container, temperature and barometric pressure effects may be reduced to a negligible value.

In the system as described, the gravity changes are determined substantially by the change in resistance across wire 2, as the resistance across wire 1, as shown in Figure 1, will change only negligibly with small changes in the weight 4. Thus, for a change in weight in the order of magnitude of $1 \times 10^{-7}$ parts, the absolute resistance across wire 1 will change in the order of magnitude of $1 \times 10^{-7}$ parts, but by the arrangement as set forth in Figure 1 the change in resistance across wire 2 may be greatly magnified thereby increasing the sensitivity of the instrument. Further, in another arrangement, as shown in Figure 3, the sensitivity may be still further increased by so arranging wires 1 and 2 that the electrical resistance of one circuit increases while that of the other circuit decreases, for any change in the gravitational attraction.

In Figure 3, conductor 1 is positioned, as shown, making an angle of $\theta_1$ with the horizontal, and conductor 2 is positioned to make an angle $\theta_2$ with the horizontal. At equilibrium, the strains on wire 2 and wire 1 may be expressed by the following relationship:

$$2S_2 (\sin \theta_2) - 2S_1 (\sin \theta_1) = W = mg$$

Here again, the wires 1 and 2 may be connected to a bridge circuit, as shown in Figure 2, in which case for an increase in $g$ the resistance of wire 1 will decrease and the resistance of wire 2 will increase in proportion thereto and the deflection of the galvanometer 8 will be substantially twice that for a given change in gravity in the system illustrated in Figure 1.

The preferred embodiment of the invention is shown in Figure 4. The fundamental principles are shown in conjunction with apparatus wherein they may be utilized. In this embodiment, mass 4 is suspended within the framework 9 by means of suspension wires 10, 11, 12, and 13. These wires are so connected as to form the four resistance grids comprising the four legs of a Wheatstone bridge circuit. The suspension wires or grids 10, 11, 12 and 13 are composed of a fine wire, such as for example No. 30 gauge Constantine or the like, space wound back and forth between the two grooved rigid pillar insulators to enable the application of a greater potential for a given low current value. These grids are preferably comprised of numerous windings. For example, grid 10 may be formed by winding 5 to 10 loops of the No. 30 gauge Constantine or other wire around the insulators or binding posts 14 and 15. The wire is wound in spaced turns so that each turn is separated from the adjacent turn. Whereas, No. 30 gauge Constantine wire has been specifically mentioned because of its particular suitabilities for this purpose, other gauge sizes may be employed as well as other materials. Thus German silver wire, manganin wire or the like of varying gauge sizes may be employed.

The support for the weight and suspension wires is a frame 9 preferably made of the same material as the resistance wires 10, 11, 12, and 13. The frame 9 may be suspended, for example, from the lid 16 of the container 17. Suitable grooved insulators such as insulator 15 are provided upon which the suspension wires are wound. Sheet cork 18, or other suitable insulating material, may be employed to thermally insulate the case.

Weight 4 should be made of a non-magnetic metal. Furthermore, it should preferably have a high specific gravity to decrease the bulk and thereby minimize buoyancy effects due to small pressure changes within the case. For best results the case is hermetically sealed to eliminate still further the effects of changes in barometric pressure at the atmosphere outside the case.

Bumper pads 19 and 20, and 21 and 22 are advantageously placed at the top and bottom of the moving system to protect the instruments against sudden jars. The tolerance between these bumper pads need be only about .005 inch inasmuch as the displacement of the weight 4 will not exceed this value. In many cases it is desirable to employ suitable means to damp the oscillation of the mass 4. This damping may be conveniently accomplished by means of magnetic suppression.

A preferred damping means is shown in Figure 4, utilizing a circular magnetic system 23, coaxial with a circular non-magnetic conducting ring 24 fastened to the mass 4. In the figure the letters N and S represent the polarity of the magnet 23 as shown. The illustrated arrangement of the damping magnet in relation to the conducting ring and mass will afford critical damping of the suspended system. The conducting ring 24 may consist of any non-magnetic conductive material such as pure copper, silver or the like. The damping of the system is not a necessary element of my invention but it is included in the preferred embodiment thereof because of the resultant decrease in time required to take individual readings. It is to be understood, however, that the particular damping means shown in Figure 4 is only illustrative of one method of accomplishment of this function and it is within the scope of my invention to use any suitable means for the accomplishment thereof.

To obtain a high degree of symmetry, identical construction is employed on each side of the block or weight 4. Thus in Figure 5, which is a cross section view of the suspension system with the extremities of the case omitted, it is seen that binding posts 14 and 15 on weight 4 and frame 9 and winding 10, respectively, are balanced by similar binding posts and winding 10a located on opposite faces of the weight and framework, also windings 11, 12 and 13 are complimented by similar binding posts and windings 11a, 12a and 13a. The weight is, therefore, suspended by two windings at each point of support. These complimentary windings are connected in series and each pair, so connected, is utilized as one leg of a Wheatstone bridge circuit.

Figure 6 illustrates the wiring diagram of the apparatus as shown in Figures 4 and 5. In the drawing the windings, complimentary to windings 10, 11, 12 and 13 shown in Figure 4 are designated by 10a, 11a, 12a, and 13a, respectively. A galvanometer 25 is connected between the 10 and 11 junction and the 12 and 13 junction and the deflections of the galvanometer at various locations of the instrument may be calibrated directly to changes in the gravitational attraction of the earth. A constant source of E. M. F. is supplied as for example by means of battery 26 to the opposite terminals of the bridge circuit. A voltmeter or potentiometer 27 should preferably be included to check the constancy of the E. M. F. and to correct for variations therein.

By reference to Figures 4 and 6 and the equation for a balanced bridge circuit, $$\frac{M}{X}=\frac{N}{P}$$

wherein X is equivalent to resistances 10 and 10a; P to resistances 11 and 11a; M to resistances 12 and 12a; and N to resistances 13 and 13a, it is apparent that when the weight increases, as a result of increased gravitational attraction the values X and N will increase while M and P will decrease. Correlatively if the weight of mass 4 should decrease, the values X and N will decrease and M and P will increase. Thus the deflection of the galvanometer will be substantially twice that which could be induced by the usage of any of these values alone as one leg of a Wheatstone bridge, the resistances of the other legs of which are maintained constant.

Further, by this method of suspension and, what might be termed unitary electrical connection, variations in the resistances of these legs as a result of factors other than changes in the weight of mass 4, such as induced by temperature changes, creep, fatigue, elastic aftereffects, and the like, are substantially compensatory within the system itself. In this manner variations of the above character are not reflected as changes in the readings of the galvanometer and therefore do not interfere with the accuracy of the instrument. This feature of the instrument permits a wide flexibility of usage and handling which is of particular importance in making possible the operation thereof by remote control. Operation by remote control has been found to be particularly advantageous where it is desired to conduct geophysical prospecting of this type over bodies of water.

One method of operation of the instrument of my invention, for example over a body of water, may involve lowering the apparatus to the ocean or lake floors by means of a cable or the like through which the galvanometer and battery leads may pass and taking readings directly in the boat above as the instrument rests on the stationary ocean floor. Such readings are then corrected for exact elevation of the instrument and a gravitational plot of the subsurface structure may then be drafted.

For underwater operation, the instrument should preferably be mounted in some type of self-leveling housing. A simple arrangement is shown in Figure 7, and comprises essentially a container 30 of any desired material and construction, capable of withstanding the desired depth of underwater operation. This container is filled with a suitable damping liquid, or viscous fluid to dampen the movement of the instrument. A suitable weight 31 is attached to the base of 30 to submerge the container and give proper stability when resting on the ocean floor.

The instrument is housed in a case 32, on the bottom of which is fastened a weight 33 symmetrically positioned to give the desired verticality to the case 32, thereby allowing it to hang suspended in a vertical position. A four-wire, insulated conductor 34, preferably of co-axial design to minimize improper alignment, leads from the instrument itself through the case 32, and then through a service head 35 in the housing 30, thence to the surface preferably in a hollow suspension cable 36. These four wires comprise the lead wires (m, n, o, and p) shown in Figure 6, whereby the changes in resistance of the bridge circuit may be measured, at the same time maintaining proper potential control across the bridge arms.

For underwater operation, and other uses where accurate leveling of the instrument housing is not possible, the mass should preferably be suspended by a radial type of suspension system, instead of the two-dimensional suspension system illustrated in Figure 4.

The radial type of suspension system is shown in top view in Figure 8, and comprises essentially a supporting frame 40, co-axially positioned around the mass 41. At the upper and lower part of the mass 41 is provided a grooved spool such as spool 42 of insulating material, such as quartz or glass, to which is fastened the supporting wires 43. At the upper and lower part of the frame 40 are fastened insulating spools 44, 44a, 44b, and 44c. The suspension wire is wound between the spools 44, etc., and the central spool 42. The purpose of this radial arrangement is to provide a suspension system whereby improper alignment of the instrument will be compensated for automatically. In this embodiment of the instrument the weight may be suspended by three but preferably four or more radial arms of the conductor or of two conductors as desired.

The radial suspension type apparatus may be more clearly visualized by reference to Figure 9 which is a vertical section on the line 9—9 of Figure 8. The relationship of the supporting frame 40, the mass 41 and the wire suspension of the mass 41 by means of the wires 43 and 43a and 43' wound between the insulating spools on the support and on the mass 41, is shown in detail. A section of the case 46 is shown similar to the case 17 of Figure 4. Only a portion of the case is included in Figure 9 in order to simplify the drawing.

It can be seen that if the suspension wire 43 comprises one continuous electrical conductor, that any errors in alignment will cause a slight increase in resistance in one or two of the radial arms with a corresponding decrease in resistance in the remaining arms, while the overall resistance will remain constant, and be dependent upon the pull exerted on the mass 41.

If desired, the radial suspension system at the upper end of the mass 41 can comprise one leg of the bridge circuit; and the corresponding suspension system at the lower end of the mass 41 can comprise the other leg of the bridge circuit. Also if desired, the upper and lower suspensions may each be divided into two separate conductors, and then connected as shown in conjunction with the instrument illustrated in Figure 4.

These methods of procedure are intended to be illustrative only and they should not be construed as limiting the usage of the apparatus of my invention to such procedures or to measurements over water, inasmuch as the instrument may be used over land or water and various procedures may be followed. The most satisfactory method of accumulating data will vary from application to application and will, in most cases, be dictated by the type of terrain which is desired to survey.

Having described my invention with reference to the broad features thereof and having illustrated the same with reference only to a few specific examples of how these broader features may be utilized, and realizing that many modifications thereof may occur to those skilled in the art without departing from the spirit or scope of the invention, I claim:

1. An apparatus for measuring variations in gravitational attraction which comprises a mass suspended by at least two electrical conductors insulated from each other, said conductors being positioned in a substantially horizontal manner and forming at least two legs of a Wheatstone bridge whereby variations in the resistance of said conductors accompanying said variations in gravitational attraction may be measured.

2. An apparatus for measuring variations in gravitational attraction which comprises a mass suspended from the lower end of a vertically disposed electrical conductor, which electrical conductor is supported at its upper end from a point near the middle of a substantially identical horizontally disposed electrical conductor but insulated therefrom, said substantially identical electric conductors forming two legs of a Wheatstone bridge whereby variations in the resistance of said conductors accompanying said variations in gravitational attraction may be measured.

3. An apparatus for measuring variations in gravitational attraction which comprises a mass suspended by a plurality of electrical conductors at its upper end, said conductors being insulated from each other, said mass having a plurality of electrical conductors attached at its lower end which conductors are likewise insulated from each other, all of said conductors being positioned in a substantially horizontal manner and forming legs of a Wheatstone bridge whereby the electrical properties of said conductors at its upper end and said conductors at its lower end will vary in opposite directions with said variations in gravitational attraction, and means for measuring the difference between the variations in electrical properties of said upper and said lower electrical conductors.

4. An apparatus for measuring variations in gravitational attraction which comprises a mass suspended at its upper end by a pair of electrical conductors and suspended at its lower end by an identical pair of electrical conductors, said pairs of electrical conductors being positioned in a substantially horizontal manner and forming the four legs of a Wheatstone bridge whereby the relative variations in resistance of said conductors may be measured.

5. An apparatus for measuring variations in gravitational attraction which comprises an insulated housing supporting therein a substantially rigid framework from which is suspended a mass of non-magnetic metal, said mass being suspended from said framework by four substantially identical conducting wire suspensions in such a manner that variations in the gravitational attraction exerted on said mass will cause two of said conductors to exhibit an increase in electrical resistance and the other two of said conductors to exhibit a decrease in electrical resistance, connecting means from said conductors to a Wheatstone bridge circuit located without said housing whereby said conductors may be utilized as the four legs of said Wheatstone bridge so as to provide means for determining the variations in resistance of said conductors which accompany the variations in gravitational attraction.

6. An apparatus according to claim 5 in which magnetic damping means are provided so as to damp undue oscillation of said mass.

7. A self-leveling apparatus for measuring variations in gravitational attraction which comprises an apparatus according to claim 1 suspended in a substantially water-tight chamber in such a manner that said apparatus according to claim 1 is free to swing within said water-tight chamber to permit leveling of said last-named apparatus within said chamber, said chamber being provided with a heavy base and with means of electrical communication between said apparatus according to claim 1 and the outside of said chamber.

8. A self-leveling apparatus for measuring variations in gravitational attraction which comprises an apparatus according to claim 1 suspended in a substantially water-tight chamber from a point near the center of the top of said chamber in such a manner that said apparatus according to claim 1 is free to swing within said water-tight chamber to permit leveling of said last-named apparatus within said chamber, said chamber being provided with a heavy base and with means of electrical communication between said apparatus according to claim 1 and the outside of said chamber, said chamber being partially filled with liquid in which said apparatus of claim 1 is at least partially submerged.

9. A self-leveling apparatus for measuring variations in gravitational attraction which comprises an apparatus according to claim 4 suspended in a substantially water tight chamber in such a manner that said apparatus according to claim 4 is free to swing within said water-tight chamber to permit leveling of said last-named apparatus within said chamber, said chamber being provided with a heavy base and with means of electrical communication between said apparatus according to claim 7 and the outside of said chamber.

JOHN J. JAKOSKY.

REFERENCES CITED

The following references are of record in the file of this patent:

UNITED STATES PATENTS

| Number | Name | Date |
| --- | --- | --- |
| 1,796,150 | Hamer | Mar. 10, 1931 |
| 1,937,223 | Gattoni | Nov. 28, 1933 |
| 1,995,305 | Hayes | Mar. 26, 1935 |
| 2,265,011 | Siegel | Dec. 2, 1941 |
| 2,294,202 | Pepper | Aug. 25, 1942 |
| 2,367,126 | James | Jan. 9, 1945 |
| 2,421,222 | Schaevitz | May 27, 1947 |
| 2,435,231 | McPherson | Feb. 3, 1948 |